US011053357B2

(12) United States Patent
Hayashi et al.

(10) Patent No.: US 11,053,357 B2
(45) Date of Patent: Jul. 6, 2021

(54) SPHERICAL POWDER CONTAINING CROSSLINKED BODY FORMED HAVING POLYROTAXANE, AND METHOD FOR PRODUCING SAME

(71) Applicants: ASM INC., Chiba (JP); HAYAKAWA RUBBER CO., LTD., Hiroshima (JP)

(72) Inventors: Yuki Hayashi, Kashiwa (JP); Keiko Nishita, Ishikawa (JP); Kohei Fujita, Ishikawa (JP); Hiromi Murakami, Fukuyama (JP); Katsumi Sakamoto, Fukuyama (JP)

(73) Assignees: ASM INC., Chiba (JP); HAYAKAWA RUBBER CO., LTD., Hiroshima (JP)

( * ) Notice: Subject to any disclaimer, the term of this patent is extended or adjusted under 35 U.S.C. 154(b) by 1 day.

(21) Appl. No.: 16/342,847

(22) PCT Filed: Oct. 16, 2017

(86) PCT No.: PCT/JP2017/037328
§ 371 (c)(1),
(2) Date: Jul. 11, 2019

(87) PCT Pub. No.: WO2018/074404
PCT Pub. Date: Apr. 26, 2018

(65) Prior Publication Data
US 2019/0345294 A1    Nov. 14, 2019

(30) Foreign Application Priority Data
Oct. 17, 2016 (JP) .............................. JP2016-203644

(51) Int. Cl.
*C08G 83/00* (2006.01)
*C08F 290/06* (2006.01)
(Continued)

(52) U.S. Cl.
CPC ........ *C08G 83/007* (2013.01); *C08F 290/061* (2013.01); *C08F 290/062* (2013.01);
(Continued)

(58) Field of Classification Search
None
See application file for complete search history.

(56) References Cited

U.S. PATENT DOCUMENTS

| 10,526,533 B2 * | 1/2020 | Shimizu | ................. G02C 7/10 |
| 2014/0329441 A1 * | 11/2014 | Mase | ................. C09K 3/1409 |
| | | | 451/39 |
| 2018/0030341 A1 * | 2/2018 | Shimizu | ................. G02B 5/23 |

FOREIGN PATENT DOCUMENTS

| EP | 2397527 A1 | 12/2011 |
| EP | 3246362 A1 | 11/2017 |

(Continued)

OTHER PUBLICATIONS

Extended European Search Report dated May 19, 2020, issued in corresponding European Application No. 17863026.5, 8 pages.

*Primary Examiner* — Peter A Salamon
(74) *Attorney, Agent, or Firm* — Christensen O'Connor Johnson Kindness PLLC

(57) ABSTRACT

The present invention provides a spherical powder having properties, such as an excellent strength, toughness, and deformation recovery, and provides a method for producing same. The present invention provides: a spherical powder containing a crosslinked body formed having (A) a polyrotaxane in which both ends of a pseudopolyrotaxane, which are formed by inclusion of the opening of a cyclic molecule by threading therethrough with a linear molecule, are provided with a capping group so that dethreading of the linear molecule is prevented, in particular, a spherical powder having an average particle diameter of 0.5 to 1,000 μm, preferably 1 to 500 μm, more preferably 1 to 300 μm, and (Continued)

still more preferably 1 to 150 μm; and a method for producing this spherical powder.

14 Claims, 1 Drawing Sheet

(51) Int. Cl.
  *C08F 290/10* (2006.01)
  *C08G 18/40* (2006.01)
  *C08G 65/26* (2006.01)
  *C08J 3/12* (2006.01)
(52) U.S. Cl.
  CPC ........ *C08F 290/068* (2013.01); *C08F 290/10* (2013.01); *C08G 18/40* (2013.01); *C08G 65/26* (2013.01); *C08J 3/122* (2013.01)

(56) References Cited

FOREIGN PATENT DOCUMENTS

| JP | 3100977 B2 | 10/2000 |
| JP | 3281555 B | 5/2002 |
| JP | 2016-069398 A | 5/2016 |
| JP | 5923113 B2 | 5/2016 |
| JP | 2016069398 A * | 5/2016 |

\* cited by examiner

SPHERICAL POWDER CONTAINING CROSSLINKED BODY FORMED HAVING POLYROTAXANE, AND METHOD FOR PRODUCING SAME

TECHNICAL FIELD

The present invention relates to a spherical powder comprising a crosslinked body comprised of a polyrotaxane, and a method for producing the spherical powder.

BACKGROUND ART

Polymer fine particles are widely used such as industrial and medical applications. Among them, polymer fine particles each having a spherical form are used for articles with increased additional value, such as functional paints, inks, toners, chromatography particles, spacers for liquid crystal elements, and microcapsules, and thus the polymer fine particles are noteworthy materials. For example, it is known that fine particles yielded by a typical pulverizing method are particles having disordered shapes, while spherical particles can be produced by using suspension polymerization, emulsion polymerization or some other methods.

Meanwhile, attention is paid to a polyrotaxane since this polymer has a special structure in which a cyclic molecule is movable relatively to an axial molecule. Incorporation of polyrotaxane structure into each of the above-mentioned spherical particles can be expected for the expression of fine particles having higher functionality.

Patent Document 1 discloses a method for producing an elastic abrasive in which abrasive grains having an average particle diameter of 0.1 to 12 μm are bonded, in a specified manner, to nuclear bodies yielded by granulating a crosslinked polyrotaxane into a predetermined grain diameter. The Document discloses that the abrasive-grain-incorporated crosslinked polyrotaxane has disordered shapes, and that the polyrotaxane is used as an adhesive due to the shapes.

Patent Document 2 discloses a (C) polyrotaxane crosslinked polymer which is yielded by polymerizing a (A) modified polyrotaxane and a (B) monomer having a radical polymeric carbon-carbon double bond, wherein the (C) polyrotaxane crosslinked polymer has a structure in which the functional monomer has reacted with a cyclic molecule of the modified polyrotaxane. The Document specifically discloses that the polyrotaxane crosslinked polymer is an aqueous dispersion comprising particles having several hundred nanometer ordered particle diameter, in which the polyrotaxane crosslinked polymer is dispersed in water.

Patent Documents 3 and 4 each discloses an example in which spherical polymer fine particles are produced and used for specified articles. Patent Document 3 discloses fine particles made of a reactant made from 80 to 100 parts by weight of a specified tri- or higher-functional polyfunctional acrylic ester, 20 parts or less by weight of a specified radical copolymeric monomer, and 0.03 to 3.0 parts by weight of an organic peroxide type radical polymerization initiator; and excellent properties thereof for liquid crystal panel spacers.

Patent Document 4 discloses a method for producing polyurethane beads by dispersing a polyisocyanate prepolymer into water containing a specified suspension stabilizer, then heating the resulting dispersion so as to synthesize polyurethane beads, followed by subjecting the beads to solid-liquid separation, washing and drying.

PRIOR ART DOCUMENT

Patent Document

Patent Document 1: JP Patent No. 5923113.
Patent Document 2: JP-A1-2016-069398.
Patent Document 3: JP Patent No. 3281555.
Patent Document 4: JP Patent No. 3100977.

DISCLOSURE OF THE INVENTION

Problems to be Solved by the Invention

An object of the present invention is to provide a spherical powder having characteristics such as an excellent strength, toughness, elastic recovery and the like, and a method for producing the spherical powder.

Further, an object of the present invention is, in addition to, or other than the above objects, to provide a molded body comprising the spherical powder.

Means for Solving Problems

The present inventors have found the following inventions:

<1> A spherical powder comprising a crosslinked body comprised of (A) a polyrotaxane comprising a pseudopolyrotaxane, which has a linear molecule and a cyclic molecule (s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s).

<2> In the above item <1>, the spherical powder may have an average particle diameter of 0.5 to 1000 μm, preferably 1 to 500 μm, more preferably 1 to 300 μm, further preferably 1 to 150 μm.

<3> In the above item <1> or <2>, the crosslinked body may be formed by crosslinking the (A) polyrotaxane and (B) a material other than the polyrotaxane.

<4> In the above item <3>, the (B) material other than the polyrotaxane may comprise
(B1) a polyol; and/or
(B2) a polyisocyanate.

<5> In the above item <4>, the (B1) polyol may be at least one selected from polyether polyols, polyester polyols, polycarbonate polyols, and polysiloxane polyols, preferably at least one selected from polyether polyols, polyester polyols, and polycarbonate polyols, more preferably at least one selected from polyether polyols and polyester polyols.

<6> In any one of the above items <1> to <5>, the (A) polyrotaxane may have a functional group selected from 1) a hydrophobic modifying group; 2) —OH, —NH$_2$, —COOH and —SH; in the cyclic molecule(s).

<7> In any one of the above items <3> to <6>, the (B) material other than the polyrotaxane may comprise (B3) a compound having a first radical polymeric group.

<8> In the above item <7>, the first radical polymeric group is at least one selected from the group consisting of an acrylic group, a methacrylic group, a styryl group, a vinyl group, a vinylidene group, and a maleic anhydride containing functional group, preferably at least one selected from an acrylic group, a methacrylic group, and a styryl group, more preferably at least one selected from an acrylic group, and a methacrylic group.

<9> In any one of the above items <1> to <8>, the (A) polyrotaxane may have a second radical polymeric group in the cyclic molecule(s). Furthermore, the second radical polymeric group may be the same as or different from the first radical polymeric group.

<10> A molded body comprising the spherical powder described in any one of the above items <1> to <9>.

<11> In the above item <10>, the molded body may be one selected from the group consisting of thin membranes/films, plates, sheets, laminated sheets, and three-dimensional shaped bodies.

<12> A method for producing a spherical powder comprising a crosslinked body comprised of (A) a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), comprising the steps of:

(I) preparing the (A) polyrotaxane;

(II) forming the crosslinked body comprising the (A) polyrotaxane; and (III) forming the spherical powder comprising the crosslinked body.

<13> In the above item <12>, in the step (III), the method may have a step of forming the spherical powder by a process selected from suspension polymerization, seed polymerization, and sol-gel process.

<14> In the above item <12> or <13>, the method may further comprise a step of (IV) preparing (B) a material other than the polyrotaxane; and in the step (II), the (A) polyrotaxane and the (B) material other than the polyrotaxane may be crosslinked to form the crosslinked body.

<15> In any one of the above items <12> to <14>, the spherical powder may have an average particle diameter of 0.5 to 1000 μm, preferably 1 to 500 μm, more preferably 1 to 300 μm, further preferably 1 to 150 μm.

Effects of the Invention

The present invention can provide a spherical powder having characteristics such as an excellent strength, toughness, elastic recovery and the like, and a method for producing the spherical powder.

Further, the present invention can provide, in addition to, or other than the above effects, a molded body comprising the spherical powder.

EMBODIMENTS FOR CARRYING OUT THE INVENTION

Figure 1:
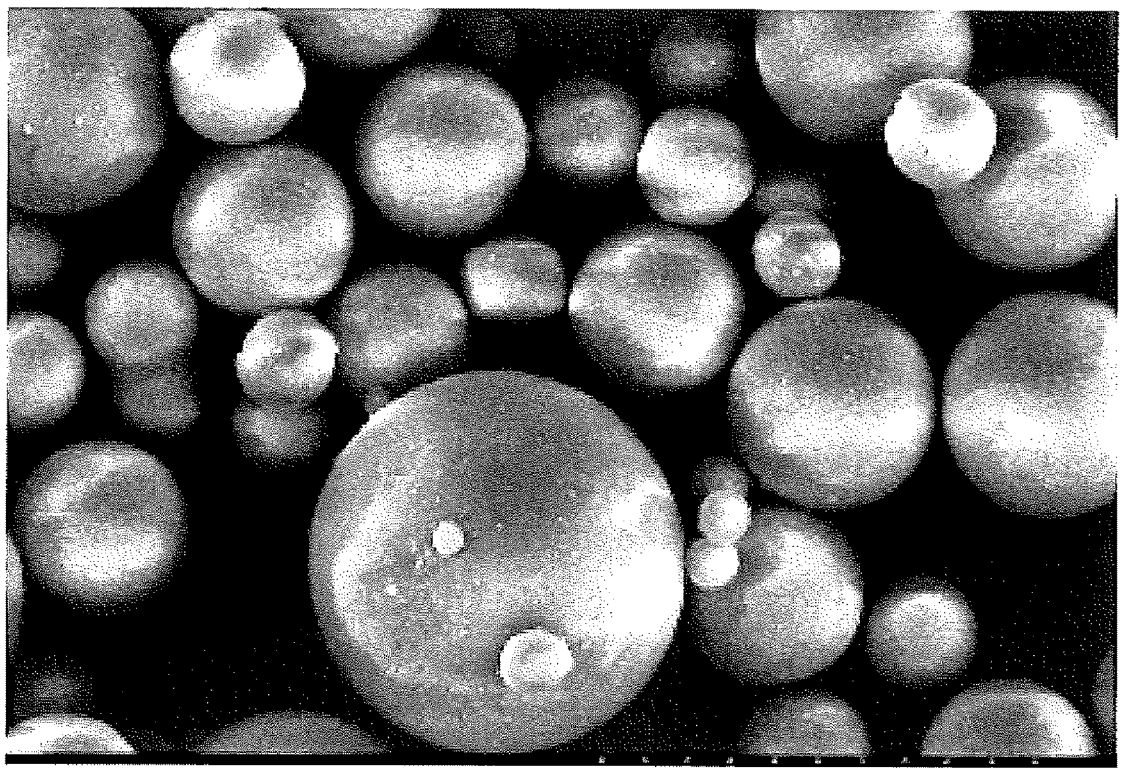
FIG. 1 represents a SEM image for polyurethane based spherical beads A2, prepared in Example 2, having an average particle diameter of 25 μm.
Figure 2:
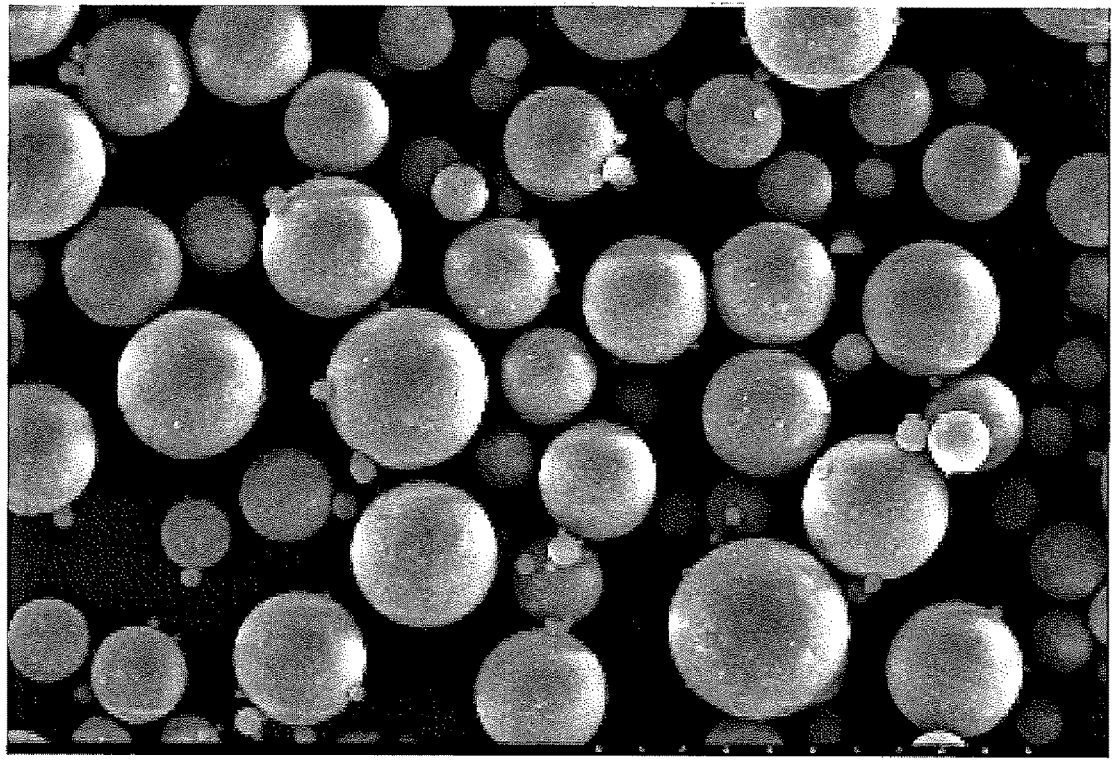
FIG. 2 represents a SEM image for acrylate based spherical beads C1, prepared in Example 4, having an average particle diameter of 16 μm.

The present invention described in the present application will be described in detail hereinafter.
<Spherical Powder>

A spherical powder according to the present invention comprises a crosslinked body comprising and formed of (A) a polyrotaxane.

<<(A) Polyrotaxane>>

A spherical powder according to the present invention comprises a crosslinked body, and the crosslinked body comprises (A) a polyrotaxane and is formed of the (A) polyrotaxane.

The crosslinked body may be formed only of the (A) polyrotaxane, or may comprise and may be formed of the (A) polyrotaxane and (B) a material other than the polyrotaxane.

The (A) polyrotaxane is comprised of a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s).

The (A) polyrotaxane may be prepared by a method described in, for example, WO2005/080469, WO2010/024431 and the like.

An amount of the (A) polyrotaxane may be 1 to 80% by weight, preferably 5 to 60% by weight, more preferably 10 to 50% by weight of a total material 100% by weight made of the crosslinked body.

Hereinafter, a cyclic molecule, a linear molecule, and a capping group which are components of the (A) polyrotaxane will be described.
<A-1. Cyclic Molecule>

The cyclic molecule of the (A) polyrotaxane is not limited as long as the cyclic molecule may be cyclic, and may have a cavity, and a linear molecule is included in the cavity (cavities) of the cyclic molecules in a skewered manner.

The cyclic molecule may have, depending on a desired spherical powder, (B) a material other than the polyrotaxane for use of formation of the spherical powder, and the like, at least one functional group selected from the group consisting of 1) a hydrophobic modifying group; 2) —OH, —NH$_2$, —COOH and —SH; and 3) an acrylic group, a methacrylic group, a styryl group, a vinyl group, a vinylidene group, a polymeric group of a maleic anhydride containing functional group.

Examples of the 1) hydrophobic modifying group may include, but are not limited to, groups having a hydrophobic group such as an acetyl group, a butyl ester group, a hexyl ester group, an octadecyl ester group, a polycaprolactone group, a poly(δ-valerolactone) group, a polylactic acid group, a polyalkylene carbonate group, a polypropylene glycol group, a polytetramethylene glycol group, a polymethyl acrylate group, a polyethylhexyl acrylate group, and the like. Among them, a polycaprolactone group, a polypropylene glycol group, or a polyalkylene carbonate group may be preferable.

The groups described in each of the items 2) and 3) may be each bonded directly to the cyclic molecule, or may be bonded thereto to interpose a spacer therebetween.

The spacer is not particularly limited. Examples thereof may include an alkylene group, an alkyleneoxide group, a hydroxyalkylene group, and a carbamoyl group; and an acrylic ester chain, a polyalkylene ether chain, and a polyalkylenecarbonate chain.

The cyclic molecule may be, for example, selected from the group consisting of α-cyclodextrin, β-cyclodextrin and γ-cyclodextrin.
<A-2. Linear Molecule>

The linear molecule of the (A) polyrotaxane is not limited as long as the linear molecule may be included in a cavity (cavities) of the cyclic molecule(s) in a skewered manner.

For example, the linear molecule may include polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. In particular, the linear molecule may be polyethylene glycol.

A weight average molecular weight of the linear molecule may be 1,000 or more, preferably 3,000 to 100,000, more preferably 6,000 to 50,000.

In the polyrotaxane, the combination of (cyclic molecule, linear molecule) may be (one derived from α-cyclodextrin, one derived from polyethylene glycol).

<A-3. Capping Group>

The capping group of the (A) polyrotaxane is not limited, as long as the group is located at both ends of a pseudopolyrotaxane, and the group has a function of preventing dissociation of a cyclic molecule(s) from a linear molecule.

For example, the capping group may be selected from the group consisting of dinitrophenyl groups; cyclodextrins; adamantane groups; trityl groups; fluoresceins; silsequioxanes; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; silsequioxanes; and pyrenes, more preferably adamantane groups or cyclodextrins.

When the crosslinked body is comprised of (A) a polyrotaxane and (B) a material other than the polyrotaxane, the (B) material other than the polyrotaxane is not particularly limited as long as the material is capable of cooperating with the (A) polyrotaxane to form a crosslinked body.

The (B) material other than the polyrotaxane may have, for example, i) (B1) a polyol; and/or (B2) a polyisocyanate; and/or
ii) (B3) a compound having a radical polymeric group.

<i) Case where (B) Material Other Than Polyrotaxane Comprises (B1) Polyol and/or (B2) Polyisocyanate>

In a case where the (B) material other than the polyrotaxane comprises the (B1) polyol and/or the (B2) polyisocyanate, the (A) polyrotaxane may comprise, in a cyclic molecule thereof, a functional group selected from 1) a hydrophobic modifying group, and/or 2) —OH, —NH$_2$, —COOH, and —SH. In particular, the polyrotaxane may comprise 2) a functional group selected from —OH, —NH$_2$, —COOH, and —SH, and may preferably have —OH and/or —NH$_2$.

<<(B1) Polyol>>

A polyol used herein means a material having two or more OH groups.

Examples of the polyols may include, but are not limited to, polycarbonate polyols, polyether polyols, polyester polyols, polyolefin polyols, polysiloxane polyols, block copolymers or graft copolymers comprised of a plural kinds of polyols (for example, polyols comprising polyester, which is block-polymerized into polyether polyols), polymers each having two or more OH groups in a side chain thereof, and the like.

The (B1) polyol may be at least one selected from polyether polyols, polyester polyols, polycarbonate polyols, and polysiloxane polyols, preferably at least one selected from polyether polyols, polyester polyols, and polycarbonate polyols, more preferably at least one selected from polyether polyols and polyester polyols.

Examples of the polycarbonate polyols may include polycarbonate diols formed from a polycondensate obtained by ester exchange reaction between ethylene carbonate and diol (examples of the diol component may include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 2-ethyl-1,6-hexandiol, 2-methyl-1,3-propanediol, 3-methyl-1,5-pentanediol and 2,4-diethyl-1,5-pentanediol, 2,2-dimethyl-1,3-propanediol, 1,4-dihydroxyethylcyclohexane, isosorbide, spiroglycol, 2,5-bis(hydroxymethyl)tetrahydrofuran, 4,4'-isopropylidene dicyclohexanol, m- or p-xylylene glycol, bisphenol A); polycarbonate triols obtained by using also a compound having three hydroxyl groups at the time of the above ester exchange reaction; polycarbonate tetraols obtained by using also a compound having 4 hydroxyl groups at the time of the above ester exchange reaction; and the like. As the compound having three hydroxyl groups, trimethylolpropane, trimethylolethane, glycerin, tri-(2-hydroxyethyl)isocyanurate and the like can be used. As the compound having four hydroxyl groups, pentaerythritol, ditrimethylolpropane and the like can be used.

Examples of the polyether polyols may include polypropylene glycol, polyethylene glycol, polytetramethylene glycol, aromatic polyether ether ketone and copolymers thereof, and the like.

Examples of the polyester polyols may include polycaprolactone polyol, polylactic acid polyol, polyethylene adipate polyol, polybutylene adipate polyol, and copolymers thereof, and the like.

Examples of the polyolefin polyols may include polybutadiene polyol, polyisoprene polyol, and copolymers thereof, and the like.

Examples of the polysiloxane polyols may include polydimethylsiloxane polyol, copolymers of polydimethylsiloxane and the above-described polyols, and the like.

Examples of the polymers each having two or more OH groups in a side chain thereof may include a product having hydroxyl groups in a side chain thereof such as polyacrylate, polyvinyl chloride, polyvinyl acetate and the like.

Even when the number of OH groups that the (B1) polyol has is two, or three or more, the species of the polyol may be only one, or plural species thereof may be together used.

The (B1) polyol may have a weight average molecular weight of 50 to 30,000, preferably 250 to 10,000, more preferably 250 to 8000.

<<(B2) Polyisocyanate>>

The term "polyisocyanate" used herein means a compound having two or more isocyanate groups.

As the (B2) polyisocyanate, known aliphatic, alicyclic and aromatic isocyanates may be used, or those which are newly synthesized may be used.

Examples of the (B2) polyisocyanate may include, but are not limited to, hexamethylene diisocyanate (HDI), dodecamethylene diisocyanate, 2,2,4-trimethylhexamethylene diisocyanate, lysine diisocyanate, 2,6-diisocyanato methylcaproate, bis(2-isocyanatoethyl)fumarate, bis(2-isocyanatoethyl) carbonate, 2-isocyanatoethyl-2,6-diisocyanatohexanoate, isophorone diisocyanate (IPDI), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene, 1,3- and/or 1,4-phenylene diisocyanate, 2,4- and/or 2,6-tolylene diisocyanate (TDI), crude TDI, 2,4'- and/or 4,4'-diphenylmethane diisocyanate (MDI), 4,4'-diisocyanato biphenyl, 3,3'-dimethyl-4,4'-diisocyanato biphenyl, 3,3'-dimethyl-4,4'-diisocyanato diphenylmethane, crude MDI, 1,5-naphthalene diisocyanate, m- and/or p-xylylene diisocyanate (XDI), α,α,α',α'-tetramethyl xylylene diisocyanate (TMXDI), and the like, as well as the derivatives or polymer thereof.

An amount of the (B2) polyisocyanate may be in a range as described below.

The amount of the polyisocyanate compound may be adjusted such that a molar ratio of isocyanate groups of the (B2) polyisocyanate to active hydrogen atoms of the polyol and the polyrotaxane, i.e., ((a molar amount of isocyanate groups of the (B2) polyisocyanate compound)/(a molar amount of active hydrogen atoms of the polyol and the polyrotaxane)) may range from 0.50 to 10.0, preferably from 1.00 to 5.00, more preferably from 1.20 to 4.00.

Furthermore, the ratio ((a molar amount of isocyanate groups of the (B2) polyisocyanate compound)/(a molar amount of active hydrogen atoms of the polyol and the polyrotaxane)) may be referred to as "NCO index".

Specific examples of the active hydrogen atoms may include hydrogens of the OH groups present in the polyol, and hydrogens or the like of OH groups present in polyrotaxane. Further, the active hydrogen atoms are not limited to hydrogen atoms derived from the OH groups. Thus, hydrogen atoms of the following groups also act as active hydrogen atoms: thiol groups, primary amino groups, secondary amino groups, and carboxylic acid groups present in the polyol and the polyrotaxane; and other groups present therein. Thus, a total molar amount of the hydrogen atoms is "a molar amount of active hydrogen atoms of the polyol and the polyrotaxane".

When active hydrogen atoms of a compound are derived from only OH groups thereof, an amount of the active hydrogen atoms therein can be represented by the hydroxyl group value, OHV, of the compound.

The crosslinked body may comprise "other components" in a case of using the (B1) polyols and/or (B2) polyisocyanate.

Examples of other components may include, but are not limited to, an antioxidant, a surface active agent, a flame retardant, a UV absorbing agent, a colorant, a pigment, a variety of fillers and the like.

As the catalyst used to promote the reaction of (B1) a polyol and/or (A) a polyrotaxane and (B2) polyisocyanate, a variety of known urethanation catalysts can be used. Examples thereof may include tertiary amines such as triethylamine, tripropylamine, tributylamine, N-methylmorpholine, N-ethylmorpholine, dimethylbenzylamine, N,N,N', N'-tetramethylhexamethylenediamine, N,N,N',N',N"-pentamethyldiethylenetriamine, bis-(2-dimethylaminoethyl) ether, N,N-dimethylethanolamine, N,N-diethylethanolamine, 1,8-diazabicyclo[5.4.0]undecene-7,1, 5-diazabicyclo[4.3.0]nonene-5,1,5-diazabicyclo[4.4.0] decene-5; metal carboxylates such as potassium acetate and potassium octylate; organometallic compounds such as stannous octoate, dibutyltin dilaurate, dioctyltin versatate, dioctyltin dilaurate, zinc naphthenate, bismuth trioctate (2-ethylhexanoic acid) and aluminum octylate, and the like.

Among them, at least one of these catalysts may be added to the formation of the crosslinked body.

An amount added may range from 0.01 to 5.0% by mass with respect to polyols.

Upon forming the crosslinked body, a solvent may be used. After the step of producing the crosslinked body, the solvent may be removed.

Examples of the solvent may include, but are not limited to, acetone, methyl ethyl ketone, cyclohexanone, ethyl acetate, and butyl acetate.

<ii) Case where (B) Material Other than Polyrotaxane Comprises (B3) Compound Having Radical Polymeric Group>

When the (B) material other than the polyrotaxane comprises the (B3) compound having a radical polymeric group, the (A) polyrotaxane may comprise, in a cyclic molecule thereof, a second radical polymeric group. The second radical polymeric group may be the same as or different from the first radical polymeric group described below.

<<(B3) Compound Having First Radical Polymeric Group>>

The radical polymeric group means a functional group polymerizable by effect of a radical species generated by a radical polymerization initiator. Further, a compound having a radical polymeric group means a compound having the above-defined "radical polymeric group".

Examples of the first radical polymeric group may include, but are not limited to, an acryl group, a methacryl group, a styryl group, a vinyl group, a vinylidene group, and maleic-anhydride/maleimide-containing functional groups.

Further, examples of the compound having a radical polymeric group may include, but are not limited to, monofunctional (meth)acrylates such as methyl (meth)acrylate, acrylonitrile, acrylamide, stearyl (meth)acrylate, isobornyl (meth)acrylate, adamantyl (meth)acrylate, dicyclopentenyl (meth)acrylate, cyclohexyl (meth)acrylate, dicyclopentenyloxyethyl methacrylate, phenoxyethyl methacrylate, 2-hydroxyethyl (meth)acrylate, n-butyl (meth)acrylate, benzyl (meth)acrylate, glycidyl (meth)acrylate, tribromophenyl (meth) acrylate, adamantyl (meth) acrylate, β-carboxyethyl (meth) acrylate, methacryloxytrimethoxysilane, and the like; bifunctional (meth)acrylates such as dipropylene glycol di(meth)acrylate, tripropylene glycol di(meth)acrylate, triethylene glycol di(meth)acrylate, polyethylene glycol 200 diacrylate, 1,6-hexanediol diacrylate, 1,9-nonanediol diacrylate, neopentyl glycol diacrylate, ethylene oxide adduct diacrylate of bisphenol A, bisphenol A diglycidyl methacrylate, polyesterdiol di(meth)acrylate, polycarbonatediol di(meth)acrylate, polyurethane di(meth)acrylate), and the like; polyfunctional (meth)acrylates such as tris(2-acryloxyethyl) isocyanurate, pentaerythritol triacrylate, dipentaerythritol polyacrylate, trimethylolpropane triacrylate, c-caprolactone-modified tris-(2-(meth)acryloxyethyl) isocyanurate, ethoxylated glycerin tri(meth)acrylate, and the like; styrene derivatives such as styrene, p-acetoxystyrene, 4-vinylbenzoic acid, sodium p-styrene sulfonate, and the like; vinyl compounds such as vinyl chloride, vinyl acetate, N-vinylacetamide methyl vinyl ketone, vinyltrimethoxysilane, vinyltriethoxysilane, dimethylethoxysilane, and the like; and various polymers in each of which any one of the above-mentioned radical polymeric groups is given to a side chain of a maleic-anhydride/maleimide-containing functional group, such as N-methylmaleimide, N-(2-hydroxyethyl)maleimide, 1,6-bis(maleimide)hexane, maleic anhydride or 2,3-dimethylmaleic anhydride.

Also in a case where the (B3) compound having a radical polymeric group is used to form the crosslinked body, the crosslinked body may comprise 'other components'.

Examples of the other component may include, but are not limited to, molecular weight modifiers, antioxidants, surface active agents, flame retardants, ultraviolet absorbers, dyes, pigments, and antistatic agents.

The molecular weight modifier may be, for example, an α-methylstyrene dimer, mercaptans, or halogenated hydrocarbons.

<<(B4) Radical Polymerization Initiator>>

In a case where the (B) material other than the polyrotaxane comprises the (B3) compound having a radical polymeric group, a radical polymerization initiator may be used.

Examples of the radical polymerization initiator may include thermal polymerization initiators, and photopolymerization initiators. These are not particularly limited, and any known polymerization initiator may be used.

An amount added of the polymerization initiator may preferably be from 0.05 to 5% by mass of the monomer mixture.

Examples of the thermal polymerization initiator may include organic peroxide type polymerization initiators such as benzoyl peroxide, lauroyl peroxide, t-butyl peroxyisobutyrate, t-butyl peroxy-2-ethylhexanoate, t-butyl peroxyneodecanoate, t-hexyl peroxypivalate, diisopropyl peroxydicarbonate, bis(4-t-butylcyclohexyl) peroxydicarbonate, and the like; azo polymerization initiators such as 2,2'-azobisisobutyronitrile, 2,2'-azobis(2,4-dimethylvaleronitrile), 2,2'-azobis(4-methoxy-2,4-dimethylvaleronitrile), and the like; and persulfates such as potassium persulfate, ammonium persulfate, sodium persulfate, and the like. These may be used singly, or may be used in combination of two or more thereof.

Examples of the photopolymerization initiator may include 1-hydroxy-cyclohexyl phenyl ketone, 2-hydroxy-2-methyl-1-phenylpropane-1-one, methylphenyl glyoxylate, acetophenone, benzophenone, diethoxyacetophenone, 2,2-dimethoxy-2-phenylacetophenone, 1-phenyl-1,2-propane-dione-2-(o-ethoxycarbonyl)oxime, 2-methyl[4-(methylthio)phenyl]-2-morpholino-1-propanone, benzil, benzoin isobutyl ether, 2-chlorothioxanthone, isopropylthioxanthone, bis(2,4,6-trimethylbenzoyl)-phenylphosphine oxide, benzoyldiphenylphosphine oxide, 2-methylbenzoyldiphenylphosphine oxide, benzoyldimethoxyphosphine oxide and the like. These may be used singly, or may be used in combination of two or more thereof.

Examples of an aqueous medium in the polymerization may include water, and a mixture of water and any water-soluble medium. If necessary, a dispersing agent or a surface active agent may be added to the aqueous medium.

<Spherical Form>

The term "spherical" used in the spherical powder according to the present invention does not require the powder to be a complete sphere as long as the powder apparently has a spherical form. The shape of powder can be verified by an ordinarily known method, depending on the size of the powder. For example, a microscope or an electronic microscope may be used.

The average particle diameter of particles of the spherical powder according to the present invention may be from 0.5 to 1000 μm, preferably from 1 to 500 μm, more preferably from 1 to 300 μm, further more preferably from 1 to 150 μm.

Furthermore, the average particle diameter can be determined by a Coulter counter measuring device, a laser diffraction/scattering measuring device, a zeta potential method measuring device, or an image analysis through, for example, a scanning electron microscope (SEM) or an optical microscope.

<Molded Body Comprising Spherical Powder>

The present invention provides a molded body comprising the above-defined spherical powder.

Examples of the molded body may include, but are not limited to, thin membranes/films, plates, sheets, laminated sheets, injection molded bodies, three-dimensional shaped bodies, cubic molded bodies, quadrate molded bodies, columnar molded bodies, spherical molded bodies, pellets, fibrous molded bodies and the like.

The spherical powder of the present invention may be used as it is, or may be used in the form of the molded body.

Application examples of the spherical powder or the molded body according to the present invention may include, but are not limited to, additives for paints/inks, scratch resistance imparting, texture modifiers, modifiers, surface slip stoppers, matting agents, matt imparting agents; additives for antireflective films, additives for light-scattering films, anti-blocking agents for films, and fluorescent coating materials; texture modifiers for cosmetics, scrubs, fluidity improvers, oil-absorbency modifiers, nail cosmetic materials, and embossed decorative sheets; functional fillers for column chromatography or ion exchange resin; resin modifying agents such as impact resistance agents, creep resistance agents, wear resistance agents, compressive residual strain improving agents (permanent set resistance agents), strength improving agents, scratch resistance agents, toughness improving agents, shrinkage reduction agents, and the like; toner particles, liquid crystal cell spacers, and electronic component materials; resin skin materials; abrasives; phosphorescent materials; medical materials; bio-bead materials; porous molded bodies; decorative sheets; lubricants; and catalyst carriers.

<Method for Producing Spherical Powder>

The present application provides a method for producing the above-defined spherical powder.

The method comprises the steps of:
(I) preparing (A) a polyrotaxane;
(II) forming a crosslinked body having the (A) polyrotaxane; and
(III) forming a spherical powder comprising the crosslinked body.

Furthermore, in a case where the crosslinked body is comprised of the (A) polyrotaxane; and (B) a material other than the polyrotaxane, the method may further comprise a step of (IV) preparing the (B) material other than the polyrotaxane, and in the step (II), the (A) polyrotaxane and the (B) material other than the polyrotaxane may be crosslinked to form a crosslinked body.

Herein, the terms "(A) polyrotaxane", "crosslinked body", "spherical powder" and "(B) material other than the polyrotaxane" are as described above.

<<Step (I)>>

The step (I) is a step of preparing (A) a polyrotaxane.

The (A) polyrotaxane may be a commercially available, or may be a newly synthesized.

<<Step (II)>>

The step (II) is a step of forming a crosslinked body comprising the (A) polyrotaxane. In a case where the crosslinked body is comprised of the (A) polyrotaxane and the (B) material other than the polyrotaxane, the method may comprise, before the step (II), a step of (IV) preparing the (B) material other than the polyrotaxane. The step (IV) is a step of preparing the (B) material other than the polyrotaxane, and the (B) material other than the polyrotaxane may be a commercially available, or may be a newly synthesized.

In the step (II), i.e., the step of forming the crosslinked body may be carried out by stirring in a reactor equipped with a stirring device at a temperature of 25 to 140° C. under an ambient pressure or an increased pressure, depending on the species and the amount of the (A) polyrotaxane to be used, the species and the amount of the (B) material other than the polyrotaxane to be used, desired properties of the crosslinked body, desired properties of the spherical powder, and others.

The formation of the crosslinked body in the step (II) may be carried out by, for example, suspension polymerization, dispersion polymerization, mini emulsion polymerization, emulsion polymerization, seed polymerization, sol-gel process, nozzle vibration process or the like. The processes can act not only as the step of (II) forming the crosslinked body, but also act as both of the step (II) and the step (III), i.e., the step of forming a spherical powder comprising the crosslinked body, which will be detailed later.

In particular, suspension polymerization may be used to conduct the crosslinking reaction upon suspension of the (A) polyrotaxane and the (B) material other than the polyrotaxane in a water solvent in the reactor. In order to suspend the (A) polyrotaxane and the (B) material other than the polyrotaxane into water, the dispersion may be carried out in the presence of a dispersion stabilizer. Examples of the dispersion stabilizer may include water-soluble polymers such as gelatin, starch, hydroxyethylcellulose, carboxymethylcellulose, polyvinylpyrrolidone, polyvinyl alkyl ethers, polyvinyl alcohol, and the like; and slightly water-soluble inorganic salts such as barium sulfate, calcium sulfate, barium carbonate, calcium carbonate, magnesium carbonate, calcium phosphate, and the like.

Further, the suspension polymerization may be carried out in the presence of solid particles (seed particles) to perform seed polymerization in which polymerization reaction from the surface of the solid particles advances to form spherical particles. The crosslinked body comprising the (A) polyrotaxane may be used as the seed particles.

More, sol-gel process may be used to polycondense an organosilane, a silane coupling agent, and others to attain silicone copolymerization to yield spherical particles.

Further, according to a dispersion polymerization, a reactive dispersion stabilizer may be used to start a polymerization from an even solution, so that precipitations or aggregates of a produced polymer may function as particulate nuclei to produce an uneven solution, and in the solution, the polymerization may advance to cause the particles to grow into target particle diameters.

<<Step (III)>>

The step (III) is a step of forming a spherical powder comprising the crosslinked body. The step may be carried out simultaneously with the step (II) or after the step (II). Preferably, the step may be carried out simultaneously with the step (II).

In the step (III), the processes described in the step (II) may be used, or a process other than the processes may be used. It is preferable to use any one of the above-mentioned processes, that is, for example, suspension polymerization, dispersion polymerization, mini emulsion polymerization, emulsion polymerization, seed polymerization, sol-gel process, and nozzle vibration process. It is more preferable to use seed polymerization or suspension polymerization.

In order to yield the spherical powder, the producing method may have a step of separating the fine particles yielded in the previous step from the liquid present during the polymerization, and then washing and drying the resultant.

The separation of the fine particles from the liquid present during the polymerization may be attained by, for example, centrifugal separation, or filtration.

The washing step may be carried out using water.

For the drying step, a process known in the prior art may be used. Usable examples of the process may include, but are not limited to, heating and drying process, air-flow drying process, spray drying process, vacuum drying process, and infrared drying process. The drying temperature depends on the spherical powder to be yielded. The temperature may be, for example, from 40 to 200° C.

<<Other Step>>

The method according to the present invention may include a step other than the above-mentioned steps (I) to (III), as required.

The other step may be, for example, but is not limited to, a step of adding the above-mentioned "other components".

EXAMPLES

Hereinafter, the present invention will be described in more detail by using, but not limited to, following examples.

<A. Preparation of Polyrotaxanes>

The following commercially available products were used as polyrotaxanes:

Commercially available product, SeRM Super Polymer SH2400P (manufactured by Advanced Softmaterials Inc., weight-average molecular weight: 400000, OHV=76 mgKOH/g, linear molecule: polyethylene glycol (weight-average molecular weight: 20000); cyclic molecule: modified α-cyclodextrin (hydroxyl groups thereof were partially substituted with hydroxypropyl groups, and then caprolactam groups were added thereto); capping groups: adamantane groups);

Commercially available product, SeRM Super Polymer SH1310P (manufactured by Advanced Softmaterials Inc., weight-average molecular weight: 180000, OHV=85 mgKOH/g, linear molecule: polyethylene glycol (weight-average molecular weight: 11000); cyclic molecule: modified α-cyclodextrin (hydroxyl groups thereof were partially substituted with hydroxypropyl groups, and then caprolactam groups were added thereto); capping groups: adamantane groups);

Commercially available product, SeRM Super Polymer SA1313P (manufactured by Advanced Softmaterials Inc., weight-average molecular weight: 190000, linear molecule: polyethylene glycol (weight-average molecular weight 11000); cyclic molecule: modified α-cyclodextrin (hydroxyl groups thereof were partially substituted with hydroxypropyl groups, caprolactam groups were added thereto, and then acryloyloxyethylcarbamoyl groups were added to terminals thereof); capping groups: adamantane groups); and Commercially available product, SeRM Super Polymer SM1313P (manufactured by Advanced Softmaterials Inc., weight-average molecular weight: 180000, linear molecule: polyethylene glycol (weight-average molecular weight 11000); cyclic molecule: modified α-cyclodextrin (hydroxyl groups thereof were partially substituted with hydroxypropyl groups, caprolactam groups were added thereto, and then methacryloxyethylccarbamoyl groups were added to terminals thereof).

Example 1

<Production of Polyurethane Based Spherical Beads A1>

600 g of water and 18 g of a product METHOLOSE 90SH-100 (hydroxypropyl methylcellulose manufactured by Shin-Etsu Chemical Co., Ltd.) were added into a 2 L separable flask with a stirrer, to dissolve the product, thereby to prepare a dispersing medium.

Separately, 150 g of the SeRM Super Polymer SH2400P as one of the polyrotaxanes; 150 g of a uretdione type polyisocyanate of hexamethylene diisocyanate as an isocyanate component; 150 g of toluene as a diluent; and 0.008 g of dibutyltin laurate as a catalyst were mixed, to prepare a bead-starting composition. In the bead-staring composition, a molar ratio of the isocyanate component to the polyol component (NCO/OH) was 3.65.

While stirring the resulting dispersing medium at 400 rpm, the above-mentioned bead-starting composition was added thereto, to prepare a suspension. Then, while stirring, the temperature of the suspension was raised to 50° C. to react the reactive components for 4 hours. Thereafter, the reaction system was cooled to a room temperature, followed by solid-liquid separation. The solid was sufficiently washed with water, and then dried at 70° C. for 20 hours, to yield polyurethane based spherical beads A1 having a nonvolatile component content of 99.2% and an average particle diameter of 35 μm.

A scanning electron microscope (SEM) shows that the polyurethane based spherical beads A1 were each in a spherical form.

Example 2

<Preparation of Polyurethane Based Spherical Beads A2>

Polyurethane based spherical beads A2 having a nonvolatile component content of 99.0% and an average particle diameter of 25 μm were yielded in a manner similar to Example 1, except that: "115 g of the SeRM Super Polymer SH1310P" was used instead of '150 g of the SeRM Super Polymer SH2400P' in Example 1; 40 g of a product PLACCEL 205 (bifunctional polycaprolactone type polyester polyol manufactured by Daicel Corp., number-average molecular weight: 500) was used as a polyol; and an amount of the uretdione type polyisocyanate of hexamethylene diisocyanate as the isocyanate component was changed from '150 g' to "145 g" (a molar ratio of the isocyanate component to the polyol component (NCO/OH) was 2.25). A SEM shows that the spherical beads A2 were each in a spherical form.

Example 3

<Preparation of Urethane Spherical Beads A3 Having, on Surfaces thereof, Radical Polymeric Groups>

Urethane spherical beads A3 having a nonvolatile component content of 99.8% an oil absorption of 80 and an average particle diameter of 28 μm were yielded in a manner similar to Example 1, except that "the SeRM Super Polymer SM1310P (OHV=13 mgKOH/g)" was used instead of 'the SeRM Super Polymer SH2400P' in Example 1 as a polyrotaxane; and an amount of the uretdione type polyisocyanate of hexamethylene diisocyanate as the isocyanate component was changed from '150 g' to "16 g" (a molar ratio of the isocyanate component to the polyol component (NCO/OH) was 2.25). The beads A3 each has methacryl groups on the surface thereof.

Example 4

<Preparation of Acrylic Based Spherical Beads C1>

Into a 2 L separable flask with a stirrer was charged 800 g of water, and thereinto was dissolved 20 g of a product METHOLOSE 90SH-100 (hydroxypropyl methylcellulose manufactured by Shin-Etsu Chemical Co., Ltd.), to prepare a dispersing medium.

Separately, 112.5 g of the SeRM Super Polymer SA1313P as one of the polyrotaxanes; 245 g of methyl methacrylate; 75 g of ethylene glycol dimethacrylate; 35 g of toluene; and 0.8 g of 2,2'-azobis(2,4-dimethylvaleronitrile) and 0.5 g of benzoyl peroxide as polymerization initiators were mixed, to prepare a bead-starting composition.

While stirring the resulting dispersing medium at 350 rpm, the above-mentioned bead-starting composition was thereto in a nitrogen atmosphere, to prepare a suspension. Then, while stirring, the temperature of the suspension was raised to 60° C. to react the reactive components for 2 hours. Thereafter, the reaction system was cooled to a room temperature, followed by solid-liquid separation. The solid was sufficiently washed with water, and then dried at 70° C. for 20 hours, to yield acrylic based spherical beads C1 having a nonvolatile component content of 98.7% and an average particle diameter of 16 μm.

A SEM shows that the acrylic based spherical beads C1 were each in a spherical form.

Example 5

<Preparation of Acrylic Based Spherical Beads C2>

Acrylic based spherical beads C2 having a nonvolatile component content of 99.5% and an average particle diameter of 18 μm were yielded in a manner similar to Example 4 except that the SeRM Super Polymer SA1313P in Example 4 was substituted with the SeRM Super Polymer SM1313P; and methyl methacrylate was substituted with n-butyl methacrylate.

A SEM shows that the acrylic based spherical beads C2 were each in a spherical form.

Comparative Example 1

Polyurethane based beads D1 having a nonvolatile component content of 99.0% and an average particle diameter of 15 μm were yielded in a manner similar to Example 1, except that 15 g of a product PLACCEL 305 (trifunctional polycaprolactone type polyester polyol, manufactured by Daicel Corp., number-average molecular weight: 500), and 95 g of the product PLACCEL 205 were used instead of a polyrotaxane component: "150 g of the SeRM Super Polymer SH2400P" in Example 1; and an amount of the uretdione type polyisocyanate of hexamethylene diisocyanate as the isocyanate component was changed from '150 g' to "190 g" (a molar ratio of the isocyanate component to the polyol component (NCO/OH) was 2.25).

Example 6

<Preparation of Acrylic Based Spherical Beads X1>

N-butyl acrylate (90 parts by mass) as a (meth)acrylic acid ester type monomer; the SeRM Super Polymer SA2400C (10 parts by mass) as a polyrotaxane having a radical polymeric group; a product Ratemuru PD-420 (1 part by mass) as a reactive surface active agent; and 2,2'-azobis (2,4-dimethylvaleronitrile) (0.4 parts by mass) and benzoyl peroxide (0.2 parts by mass) as radical polymerization initiators were mixed, to prepare an oil phase. Further, ion exchange water (200 parts by mass) as an aqueous medium; and polyvinyl pyrrolidone K-25 (10 parts by mass) as a dispersing medium were mixed, to prepare a water phase.

Then, the oil phase was added to the water phase, and then a homogenizer was used to subject the resultant to emulsifying dispersion to prepare a suspension. The suspension was put into a polymerizing vessel equipped with a stirrer and a thermometer. While stirring at a rotation speed of 500 rpm, the internal temperature of the vessel was raised to 50° C. Thereafter, while this temperature 50° C. was kept, the suspension was stirred for 3 hours to conduct a suspension polymerization reaction. Sodium dodecylbenzenesulfonate (0.05 parts by mass) as a surface active agent was additionally added to the polymerization reaction liquid, and the internal temperature was raised to 90° C. Thereafter, while the temperature 90° C. was kept, the suspension was stirred for 1 hour to complete the suspension polymerization reaction.

A SEM shows that the resultant acrylic based spherical beads X1 comprising the polyrotaxane were in the form of complete spheres having an average particle diameter of 10 µm.

Example 7

<Preparation of Acrylic Based Spherical Beads X2>
(First Step) Production of Seed Particles Pure water (400 parts by weight) and a silane coupling agent (16 parts by weight) were added to a reactor equipped with a stirrer and a thermometer. Thereafter, while stirring, the temperature of the reactor was raised to 55° C. While the temperature was kept, the liquid was stirred for 3 hours to conduct a hydrolysis reaction.

Separately, pure water (600 parts by weight) and a 25%-concentration ammonia solution in water (0.2 parts by weight) were mixed, to prepare a condensing agent solution.

The total amount of the condensing agent solution was added to the hydrolysis reaction liquid. Thereafter, while the temperature of the rector was kept, the liquid was stirred for 1 hour to conduct a dehydration condensation reaction, to yield a seed-particle-dispersed liquid in which the particles had an average particle diameter of 1.6 µm and a deviation coefficient of 2.9%.
(Second Step) Production of Fine Acrylic Copolymer Particles Methyl methacrylate (90 parts by mass) as a (meth)acrylic acid ester type monomer; the SeRM Super Polymer SA2400C (10 parts by mass) as a polyrotaxane having a radical polymeric group; and benzoyl peroxide (1 part by mass) as a radical polymerization initiator were mixed, to prepare an oil phase.

Further, ion exchange water (266 parts by mass) as an aqueous medium; and polyvinyl alcohol (14 parts by mass) as a dispersing medium were mixed, to prepare a water phase.

Then, the oil phase was added to the water phase, and then a homogenizer was used to subject the resultant to emulsifying dispersion, to prepare a suspension.

The suspension was put into a polymerizing vessel equipped with a stirrer and a thermometer. The total amount of the seed particle dispersed liquid yielded through the first step was added thereto. Thereafter, the reaction system was continuously stirred at a rotation speed of 200 rpm to cause monomer components in the emulsion to be absorbed to the seed particles.

Thereafter, the internal temperature of the vessel was raised to 80° C. Thereafter, while the temperature was kept, the reaction system was stirred for 10 hours to complete the polymerization reaction.

A SEM shows that the resultant acrylic based spherical beads X2 comprising the polyrotaxane were in the form of complete spheres having an average particle diameter of 2.8 µm. Further, a flow type particle image analyzer (FPIA) was used to determine the resultant fine particles. As a result, the deviation coefficient thereof was 3.2%.

Example 8

<Preparation of Styrene Type Spherical Beads X3>

Pure water (500 parts by weight) and a silane coupling agent (16 parts by weight) were added to a reactor equipped with a stirrer and a thermometer. Thereafter, while stirring, the temperature of the reactor was raised to 55° C. While this temperature was kept, the liquid was stirred for 3 hours to conduct a hydrolysis reaction.

Separately, pure water (600 parts by weight) and a 25%-concentration ammonia solution in water (0.2 parts by weight) were mixed to prepare a condensing agent solution.

The total amount of the condensing agent solution was added to the hydrolysis reaction liquid. Thereafter, while the temperature of the rector was kept, the liquid was stirred for 1 hour to conduct a dehydration condensation reaction, to yield a seed particle dispersed liquid in which the particles had an average particle diameter of 1.6 µm and a deviation coefficient of 2.9%.

Styrene monomer (90 parts by mass) as a compound having a radical polymeric group; the SeRM Super Polymer SA2400C (10 parts by mass) as a polyrotaxane having a radical polymeric group; and benzoyl peroxide (1 part by mass) as a radical polymerization initiator were mixed, to prepare an oil phase. Further, ion exchange water (625 parts by mass) as an aqueous medium; cetyl alcohol (5 parts by mass); and polyvinyl pyrrolidone K-30 (15 parts by mass) as a dispersing medium were mixed, to prepare a water phase.

Then, the oil phase was added to the water phase, and then a homogenizer was used to subject the resultant to emulsifying dispersion, to prepare a suspension. The suspension was put into a polymerizing vessel equipped with a stirrer and a thermometer. While stirring at a rotation speed of 300 rpm, the internal temperature of the vessel was raised to 75° C. Thereafter, while the temperature 75° C. was kept, the suspension was stirred for 24 hours to complete a suspension polymerization reaction.

A SEM shows that the resultant styrene type spherical beads X3 comprising the polyrotaxane were in the form of complete spheres having an average particle diameter of 6.5 μm.

Further, a flow type particle image analyzer (FPIA) was used to determine the resultant fine particles. As a result, the deviation coefficient thereof was 3.8%.

Example 9

<Preparation of Acrylic-Silicone Copolymer Type Spherical Beads X4>
(First Step) Production of Seed Particles RO water (200 parts by weight) and vinyltrimethoxysilane (20 parts by weight) as a silane coupling agent having a radical polymeric group were added to a reactor equipped with a stirrer and a thermometer. Thereafter, while the temperature of the reactor was kept at room temperature, the liquid was stirred for 3 hours to conduct a hydrolysis reaction.

Into the reaction solution was added a 0.5 M ammonia solution in water (2 parts by weight). Thereafter, while the temperature was kept, the solution was stirred for 1.5 hours to conduct a dehydration condensation reaction. The resultant particles made of a polyorganosiloxane had an average particle diameter of 1.53 μm and a deviation coefficient of 1.8%.
(Second Step)

RO water (1800 parts by weight) was additionally added to the reaction solution in the first step, and the solution was stirred to disperse the particles yielded through the first step evenly.

Separately, vinyltrimethoxysilane (80 parts by weight) having a radical polymeric group, and methacrloxytrimethoxysilane (10 parts by weight) as silane coupling agents; the SeRM Super Polymer SA2400C (10 parts by mass) as a polyrotaxane having a radical polymeric group were mixed, to prepare a polycondensation active solution.

While stirring the reaction solution at a rotation speed of 20 rpm, to the upper phase thereof was slowly added the total amount of the polycondensation active solution so as to maintain the interface between the two phases. Also after the end of the addition, the stirring was continued while the temperature of the present system and the rotation speed of the stirrer were kept as they were, to conduct a hydrolysis and a dehydration condensation of the silane coupling agents.

The reactions were continued until the upper phase disappeared so that the two phases turned visually into one phase, and then thereto was added a 28% by weight ammonia solution in water (10 parts by weight). Thereafter, the stirring was continued for 5 hours while the temperature of the present system and the rotation speed of the stirrer were kept as they were to complete the dehydration condensed reaction.

A SEM shows that the resultant acryl-silicone copolymer spherical beads X4 comprising the polyrotaxane were in the form of complete spheres having an average particle diameter of 2.2 μm. The deviation coefficient thereof was 3.8%.

Example 10

<Preparation of Acrylic Based Spherical Beads X5>

A suspension polymerization reaction was completed in a manner similar to Example 6, except that: the SeRM Super Polymer SA1310P was used as the polyrotaxane having the radical polymeric group, instead of the SeRM Super Polymer SA2400C in Example 6; and polyvinylpyrrolidone K-90 was used as the dispersing agent, instead of the polyvinyl pyrrolidone K-25.

A scanning electron microscope (SEM) shows that the resultant acrylic based spherical beads X5 comprising the polyrotaxane were in the form of complete spheres having an average particle diameter of 800 μm.

Comparative Example 2

<Preparation of Acrylic Crosslinked Spherical Beads CX>

Methyl methacrylate (95 parts by mass) as a (meth)acrylic acid ester type monomer; diethylene glycol methacrylate (5 parts by mass) as a crosslinking (meth)acrylic acid ester monomer having a radical polymeric group; and 2,2'-azobisisobutylnitrile) (0.2 parts by mass) and benzoyl peroxide (0.2 parts by mass) as radical polymerization initiators were mixed, to prepare an oil phase. Further, ion exchange water (200 parts by mass) as an aqueous medium; and polyvinylpyrrolidone K-90 (10 parts by mass) and sodium alkylsulphate (0.05 parts by mass) as dispersing media were mixed, to prepare a water phase.

Then, the oil phase was added to the water phase, and then a homogenizer was used to subject the resultant to emulsifying dispersion to prepare a suspension. The suspension was put into a polymerizing vessel equipped with a stirrer and a thermometer. While stirring at a rotation speed of 500 rpm, the internal temperature of the vessel was raised to 50° C. Thereafter, while this temperature 50° C. was kept, the suspension was stirred for 3 hours, to conduct a suspension polymerization reaction. Sodium dodecylbenzenesulfonate (0.05 parts by mass) as a surface active agent was additionally added to the polymerization reaction liquid, and the internal temperature was raised to 90° C. Thereafter, while this temperature 90° C. was kept, the suspension was stirred for 1 hour to complete the suspension polymerization reaction.

A scanning electron microscope (SEM) shows that the resultant acrylic crosslinked spherical beads CX were in the form of complete spheres having an average particle diameter of 10 μm.

Example 11

<Preparation of Molded Body (Molded Sheet) P1 Having Polyurethane based spherical beads A2>

A molded product P1 was yielded from 1 part by weight of the polyurethane based spherical beads A2 produced in Example 2, and 99 parts by weight of a thermoplastic polyurethane resin (Elastollan ET385-10 (manufactured by BASF).

Specifically, 99 parts by weight of the thermoplastic polyurethane resin were kneaded under conditions of 190° C. and 50 rpm, and then 1 part by weight of the polyurethane based spherical beads A2 was introduced thereinto. The kneading was then continued for 1 to 2 minutes. The molding was performed at 160 to 165° C., to yield a transparent and pale yellow molded sheet P1 having 150 mm×150 mm×2 mm thickness.

Properties for the resultant molded sheet P1, were determined as described below. The results are shown in Table 1.
<Tensile Strength, Breaking Elongation, and Stress (100%) and Stress (300%)>

In accordance with JIS K7311, the resultant molded sheet and a universal material tester, model 5566, were used to conduct a tensile test to determine the tensile strength, the breaking elongation, and the stress (100%) and stress (300%) thereof.

<Hardness (Durometer A)>

In accordance with JIS K7311, a durometer type A HD-1110 (manufactured by Ueshima Seisakusho Co., Ltd.) was used to determine the hardness (durometer A) of the sheet.

Example 12

<Preparation of Molded Body (Molded Sheet) P2 Having Polyurethane Based Spherical Beads A2>

A transparent and pale yellow molded sheet P2 having 150 mm×150 mm×2 mm thickness was yielded in a manner similar to Example 11, except that an amount of the polyurethane based spherical beads A2 and that of the thermoplastic polyurethane resin were changed from the '1.0 parts by weight' and the '99.0 parts by weight' in Example 11 to "3.0 parts by weight" and "97.0 parts by weight", respectively.

Example 13

<Preparation of Molded Body (Molded Sheet) P3 Having Polyurethane Based Spherical Beads A2>

A transparent and pale yellow molded sheet P3 having 150 mm×150 mm×2 mm in thickness was yielded in a manner similar to Example 11, except that an amount of the polyurethane based spherical beads A2 and that of the thermoplastic polyurethane resin were changed from the '1.0 parts by weight' and the '99.0 parts by weight' in Example 11 to "5.0 parts by weight" and "95.0 parts by weight", respectively.

Comparative Example 3

A transparent and pale yellow molded sheet CP having 150 mm×150 mm×2 mm thickness was yielded in a manner similar to Example 11, except that an amount of the polyurethane based spherical beads A2 and that of the thermoplastic polyurethane resin in Example 11 were changed from the '1.0 parts by weight' and the '99.0 parts by weight' to "0 parts by weight" and "100 parts by weight", respectively.

TABLE 1

The composition and properties of each of the respective molded sheets P1 to P3 (in Examples 11 to 13), and the molded sheet CP (Comparative Example 3)

| Items | Example 11 | Example 12 | Example 13 | Comparative Example 3 |
|---|---|---|---|---|
| Addition amount of fine particles (part(s) by weight) | 1.0 | 3.0 | 5.0 | 0 |
| Thermoplastic polyurethane resin (part(s) by weight) | 99.0 | 97.0 | 95.0 | 100 |
| Tensile strength (MPa) | 31 | 34 | 29 | 23 |
| Breaking elongation (%) | 480 | 460 | 360 | 420 |
| Stress (100%) | 7.8 | 7.8 | 8.6 | 7.6 |
| Stress (300%) | 19 | 21 | 24 | 17 |
| Hardness (durometer A) | 83 | 84 | 83 | 83 |

Example 14

<Viscoelasticity Evaluation of Spherical Beads>

The spherical beads yielded in each of Example 2 and Comparative Example 1 were used to determine the elastic recovery of any one of the spherical particles by means of a micro hardness meter (Fischer scope HM2000XYP). A planar indenter of 50 μm×50 μm size was used to press each of the particles at 1000 mN, and then the particles were recovered to an original state thereof at the same rate. Immediately after the recovery, the respective recoveries (%) of the shapes of the particles were compared with each other.

As a result, the elastic recovery of Example 2 (beads A2) was 87% while that of Comparative Example 3 (beads D1) was 72%.

Example 15

For the spherical beads yielded in each of Example 6 (beads X1) and Comparative Example 2 (beads CX), the same device as in Example 14 was used to apply a load force thereto along the particle diameter direction thereof. As a result, even when the beads X1 were deformed into a proportion of 90% or more, the beads were recovered. However, when the acrylic crosslinked spherical beads CX were deformed into a proportion more than 50%, the beads were broken.

Table 1 shows the following:

In comparison of Examples 11 to 13 with Comparative Example 3, it is shown that the sheets of Examples 11 to 13 were increased in strength by the slight addition of the fine particles while keeping the hardness of the sheets. In other words, it is shown that the molded sheets P1 to P3 each comprising the polyurethane based spherical beads according to the present invention can be improved in resin strength.

Further, according to the results of Examples 14 and 15, spherical beads comprising a polyrotaxane show a high deformation percentage even when a load force is applied thereto. More, when the applied load is removed, the beads are recovered with a high elastic recovery. In short, it is shown that the beads according to the present invention are excellent in shape recovery against the deformation thereof.

What is claimed is:

1. A spherical powder comprising a crosslinked body comprised of (A) a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the powder is spherical and the powder is free from any solvent.

2. The spherical powder according to claim 1 having an average particle diameter of 0.5 to 1000 μm.

3. The spherical powder according to claim 1, wherein the crosslinked body is formed by crosslinking the (A) polyrotaxane and (B) a material other than the polyrotaxane.

4. The spherical powder according to claim 3, wherein the (B) material other than the polyrotaxane comprises
(B1) a polyol; and/or
(B2) a polyisocyanate.

5. The spherical powder according to claim 4, wherein the (B1) polyol is at least one selected from polyether polyols, polyester polyols, polycarbonate polyols, and polysiloxane polyols.

6. The spherical powder according to claim 1, wherein the (A) polyrotaxane has a functional group selected from 1) a hydrophobic modifying group; 2) —OH, —NH$_2$, —COOH and —SH in the cyclic molecule(s).

7. The spherical powder according to claim 3, wherein the (B) material other than the polyrotaxane comprise (B3) a compound having a first radical polymeric group.

8. The spherical powder according to claim 7, wherein the first radical polymeric group is at least one selected from the group consisting of an acrylic group, a methacrylic group, a styryl group, a vinyl group, a vinylidene group, a maleic anhydride containing functional group.

9. The spherical powder according to claim 7, wherein the (A) polyrotaxane has a second radical polymeric group in the cyclic molecule(s).

10. A molded body comprising the spherical powder according to claim 1.

11. A method for producing a spherical powder comprising a crosslinked body comprised of (A) a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), comprising the steps of:
  (I) preparing the (A) polyrotaxane;
  (II) forming the crosslinked body comprising the (A) polyrotaxane; and
  (III) forming the spherical powder comprising the crosslinked body.

12. The method according to claim 11, wherein the spherical powder is formed by a process selected from suspension polymerization, seed polymerization, and sol-gel process.

13. The method according to claim 11, further comprising a step of (IV) preparing (B) a material other than the polyrotaxane; and in the step (II), the (A) polyrotaxane and the (B) material other than the polyrotaxane is crosslinked to form the crosslinked body.

14. The method according to claim 11, wherein the spherical powder having an average particle diameter of 0.5 to 1000 μm.

* * * * *